US010202145B2

United States Patent
Kariatsumari et al.

(10) Patent No.: US 10,202,145 B2
(45) Date of Patent: Feb. 12, 2019

(54) ELECTRIC POWER STEERING SYSTEM

(71) Applicant: JTEKT CORPORATION, Osaka-shi, Osaka (JP)

(72) Inventors: Yuji Kariatsumari, Kitakatsuragi-gun (JP); Tatsuma Kouchi, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 166 days.

(21) Appl. No.: 15/251,452

(22) Filed: Aug. 30, 2016

(65) Prior Publication Data
US 2016/0368533 A1 Dec. 22, 2016

Related U.S. Application Data

(62) Division of application No. 14/295,914, filed on Jun. 4, 2014, now Pat. No. 9,499,196.

(30) Foreign Application Priority Data

Jun. 11, 2013 (JP) .................................. 2013-122842

(51) Int. Cl.
*B62D 5/04* (2006.01)
*B62D 6/00* (2006.01)
(Continued)

(52) U.S. Cl.
CPC ......... *B62D 5/0472* (2013.01); *B62D 5/0463* (2013.01); *B62D 6/002* (2013.01);
(Continued)

(58) Field of Classification Search
None
See application file for complete search history.

(56) References Cited

U.S. PATENT DOCUMENTS 5,363,300 A 11/1994 Lin
5,444,346 A 8/1995 Sudo et al.
(Continued)

FOREIGN PATENT DOCUMENTS

EP 1 839 998 A1 10/2007
IR 2 839 037 A1 10/2003
(Continued)

OTHER PUBLICATIONS

Sep. 30, 2015 Search Report issued in European Patent Application No. 14171568.0.
(Continued)

*Primary Examiner* — Kevin P Mahne
(74) *Attorney, Agent, or Firm* — Oliff PLC

(57) ABSTRACT

In an electric power steering system, a low-pass filter executes a low-pass filtering process on a detected steering torque value detected by a torque sensor. A steering torque deviation computing unit computes a deviation $\Delta T$ between a detected steering torque value $T^*$ obtained through the low-pass filtering process and the detected steering torque value detected by the torque sensor. A PI control unit generates a vibration compensation value used to lead the detected steering torque value to the steering torque value obtained through the low-pass filtering process, by executing PI computation on the steering torque deviation computed by the steering torque deviation computing unit.

2 Claims, 15 Drawing Sheets

(51) Int. Cl.
  *B62D 6/02* (2006.01)
  *B62D 6/04* (2006.01)
  *B62D 6/10* (2006.01)

(52) U.S. Cl.
  CPC ............ *B62D 6/003* (2013.01); *B62D 6/008* (2013.01); *B62D 6/02* (2013.01); *B62D 6/04* (2013.01); *B62D 6/10* (2013.01); *B60W 2510/20* (2013.01); *B60W 2520/10* (2013.01); *B60W 2520/14* (2013.01); *B60W 2710/20* (2013.01); *B62D 6/001* (2013.01)

(56) References Cited

U.S. PATENT DOCUMENTS

| | | |
|---|---|---|
| 2004/0019417 A1 | 1/2004 | Yasui et al. |
| 2004/0031641 A1 | 2/2004 | McLaughlin |
| 2005/0057095 A1 | 3/2005 | Hac |
| 2008/0185212 A1* | 8/2008 | Akuta ............... B62D 6/002 180/400 |
| 2010/0042295 A1* | 2/2010 | Shibata ............. B62D 5/008 701/41 |
| 2011/0153162 A1 | 6/2011 | Kezobo et al. |
| 2012/0197493 A1 | 8/2012 | Fujimoto et al. |
| 2014/0019008 A1* | 1/2014 | Nakamura ......... B62D 6/008 701/42 |
| 2016/0001784 A1 | 1/2016 | Markkula |

FOREIGN PATENT DOCUMENTS

| | | |
|---|---|---|
| JP | 2003-002215 A | 1/2003 |
| JP | 2005-112044 A | 4/2005 |
| JP | 2007-112189 A | 5/2007 |

OTHER PUBLICATIONS

Apr. 18, 2016 Office Action Issued in U.S. Appl. No. 14/295,914.
U.S. Appl. No. 14/295,914, filed Jun. 4, 2014 in the name of Kariatsumari et al.

* cited by examiner

ELECTRIC POWER STEERING SYSTEM

INCORPORATION BY REFERENCE

This is a Division of U.S. application Ser. No. 14/295,914 filed Jun. 4, 2014, which claims the benefit of Japanese Application No. 2013-122842 filed Jun. 11, 2013. The disclosures of the prior applications are hereby incorporated by reference herein in their entireties.

BACKGROUND OF THE INVENTION

1. Field of the Invention

The invention relates to an electric power steering system that assists a steering operation by transmitting driving force generated by an electric motor to a steered mechanism of a vehicle.

2. Description of the Related Art

There is an electric power steering system that transmits driving force generated by an electric motor to a steered mechanism of a vehicle, thereby assisting a driver's steering operation. The electric motor is controlled by an electronic control unit on the basis of, for example, a steering torque applied to a steering wheel and a vehicle speed. Specifically, detection signals from a steering torque sensor that detects a steering torque and a vehicle speed sensor that detects a vehicle speed are input into the electronic control unit. The electronic control unit sets a target current value on the basis of the input signals from the sensors and executes feedback control on the electric motor on the basis of the target current value.

When a tire bursts, the steering torque varies. The variations in the steering torque hinder a steering operation and thus should be suppressed. Techniques for suppressing vibrations due to disturbance through electric control are described in Japanese Patent Application Publications No. 2003-2215 (JP 2003-2215 A), No. 2007-112189 (JP 2007-112189 A), and No. 2005-112044 (JP 2005-112044 A). However, the variations in steering torque when a tire bursts are considerably large, and it is thus difficult to suppress such large variations in the steering torque through the electrical control. Therefore, a mechanical vibration suppressing mechanism such as a bushing is required in the related art.

SUMMARY OF THE INVENTION

One object of the invention is to provide an electric power steering system that restrains steering torque from varying, for example, at the time of a burst of a tire through electrical control.

An aspect of the invention relates to an electric power steering system that applies steering assist force from an electric motor to a steered mechanism of a vehicle, the steered mechanism transmitting steering force to steered wheels, including: a steering torque detecting unit that detects a steering torque; a basic target current value setting unit that sets a basic target current value for the electric motor based on a detected steering torque value detected by the steering torque detecting unit; a vibration compensation value generating unit that generates a vibration compensation value for suppressing vibration, based on the detected steering torque value; a target current value computing unit that computes a target current value, based on the basic target current value set by the basic target current value setting unit and the vibration compensation value generated by the vibration compensation value generating unit; and a control unit that controls the electric motor based on the target current value computed by the target current value computing unit. The vibration compensation value generating unit includes: a low-pass filter that executes a low-pass filtering process on the detected steering torque value; and a unit that generates a vibration compensation value for leading the detected steering torque value to the detected steering torque value obtained through the low-pass filtering process, based on a deviation between the detected steering torque value that has not been subjected to the low-pass filtering process and the detected steering torque value obtained through the low-pass filtering process.

In the electric power steering system according to the above aspect, the vibration compensation value for leading the detected steering torque value to the detected steering torque value obtained through the low-pass filtering process is generated based on the deviation between the detected steering torque value that has not been subjected to the low-pass filtering process and the detected steering torque value obtained through the low-pass filtering process. The target current value is computed by adding the vibration compensation value to the basic target current value. The electric motor is controlled based on the target current value.

For example, when a tire bursts, the detected steering torque value obtained through the low-pass filtering process is a steering torque value obtained by removing the vibration component based on the burst of the tire from the detected steering torque value. Thus, when a tire bursts, the electric motor is controlled such that the actual steering torque value approaches the steering torque value obtained by removing the vibration component based on the burst of the tire from the detected steering torque value. Because the vibration based on the burst of the tire is suppressed, it is possible to suppress variations in the steering torque at the time of occurrence of the tire burst.

Another aspect of the invention relates to an electric power steering system that applies steering assist force from an electric motor to a steered mechanism that transmits steering force to steered wheels, including: a vehicle speed detecting unit that detects a vehicle speed; a steering angle detecting unit that detects a steering angle; a steering velocity detecting unit that detects a steering velocity; a steering torque detecting unit that detects a steering torque; a target steering torque value setting unit that sets a target steering torque value based on a detected steering angle value detected by the steering angle detecting unit, a detected vehicle speed value detected by the vehicle speed detecting unit, and a detected steering velocity value detected by the steering velocity detecting unit; a target current value computing unit that computes a target current value for leading the detected steering torque value to the target steering torque value, based on the target steering torque value set by the target steering torque value setting unit and the detected steering torque value detected by the steering torque detecting unit; and a control unit that controls the electric motor based on the target current value computed by the target current value computing unit.

In the electric power steering system according to the other aspect described above, the target current value for leading the detected steering torque value to the target steering torque value is computed. The electric motor is controlled based on the target current value. The target steering torque value is a target steering torque value set under no influence of the vibration based on the force from the tire side. Thus, when a tire bursts, the electric motor is controlled so that the actual steering torque value approaches the target steering torque value set under no influence of the vibration based thereon. As a result, the vibration based on the tire burst is suppressed, and thus it is possible to suppress variations in the steering torque when the tire burst occurs.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
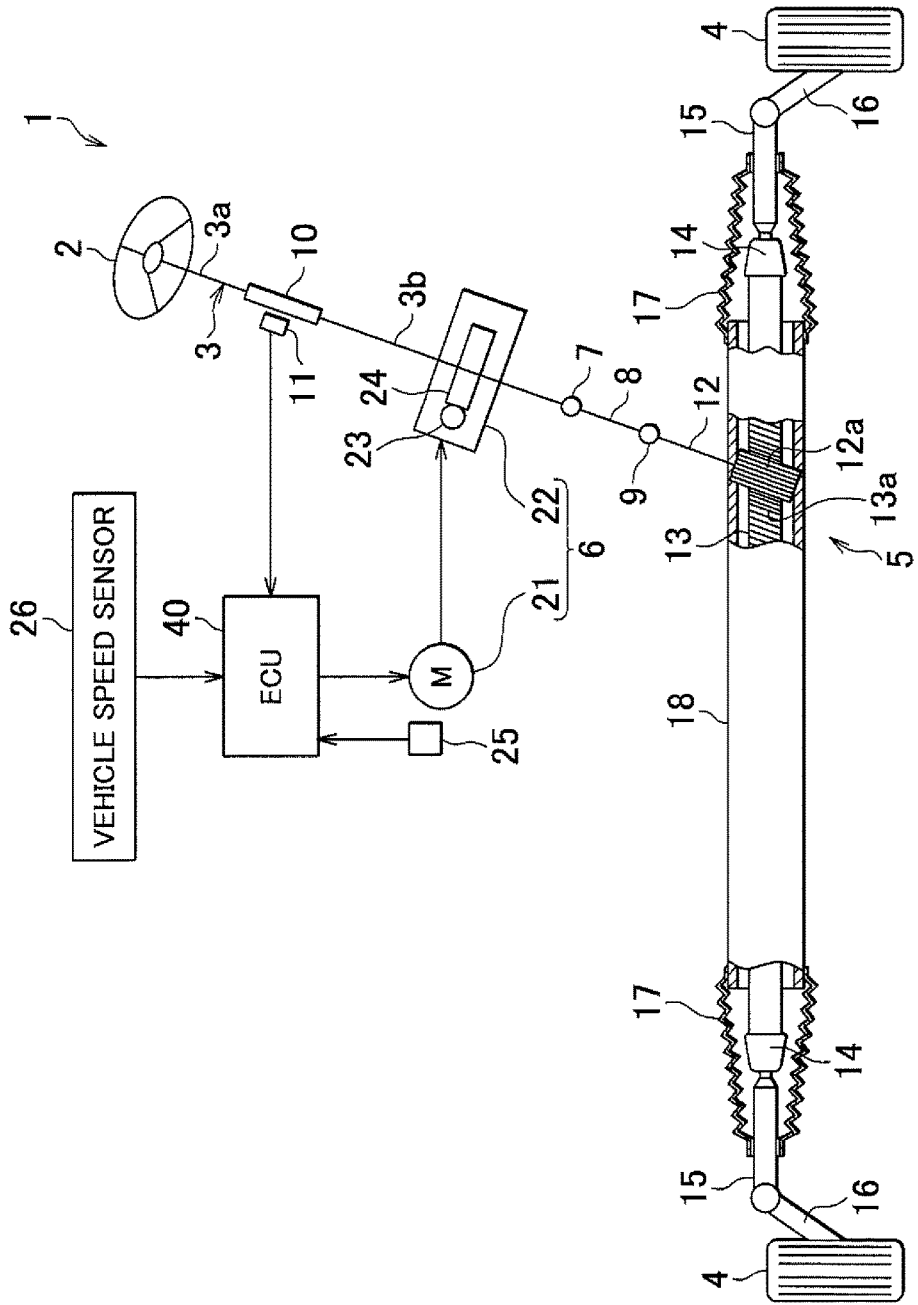
FIG. 1 is a schematic view illustrating the schematic configuration of an electric power steering system according to a first embodiment of the invention.

Hereinafter, embodiments of the invention will be described in detail with reference to the accompanying drawings. FIG. 1 is a schematic view illustrating the schematic configuration of an electric power steering system 1 according to a first embodiment of the invention. The electric power steering system 1 includes a steering shaft 3 to which a steering wheel 2, serving as a steering member, is connected, a steered mechanism 5 that steers steered wheels 4 in response to the rotation of the steering wheel 2, and a steering assist mechanism 6 that assists a driver's steering operation.

The steering shaft 3 is connected to an intermediate shaft 8 via a first universal joint 7. The intermediate shaft 8 is connected to a pinion shaft 12 of the steered mechanism 5 via a second universal joint 9. Thus, the steering wheel 2 is mechanically connected to the steered mechanism 5 via the steering shaft 3, the first universal joint 7, the intermediate shaft 8, and the second universal joint 9.

The steering shaft 3 includes an input shaft 3a connected to the steering wheel 2 and an output shaft 3b connected to the intermediate shaft 8. The input shaft 3a and the output shaft 3b are connected to each other via a torsion bar 10 so as to be rotatable relative to each other on the same axis line. That is, when the steering wheel 2 is rotated, the input shaft 3a and the output shaft 3b rotate in the same direction while rotating relative to each other.

A torque sensor 11 is disposed around the steering shaft 3. The torque sensor 11 detects a steering torque applied to the steering wheel 2 on the basis of the relative rotational displacement between the input shaft 3a and the output shaft 3b. Hereinafter, the steering torque detected by the torque sensor 11 will be referred to as a detected steering torque value T. An output signal from the torque sensor 11 is input into an electronic control unit (ECU) 40.

The steered mechanism 5 includes a pinion shaft 12 and a rack shaft 13 that serves as a steered shaft. The rack shaft 13 extends linearly along the lateral direction of a vehicle. The rack shaft 13 is supported by a plurality of bearings (not illustrated) in a rack housing 18 fixed to a vehicle body so as to be able to linearly reciprocate in the axial direction. End portions of the rack shaft 13 are exposed on the outside of corresponding end portions of the rack housing 18. Each end portion of the rack shaft 13 is connected to one end of a tie rod 15 via a ball joint 14. The other end of each tie rod 15 is connected to the corresponding steered wheel 4 via a knuckle arm 16.

Each ball joint 14 is accommodated in a tubular bellows 17. Each bellows 17 extends from the corresponding end portion of the rack housing 18 to the corresponding tie rod 15. One end and the other end of each bellows 17 are attached to the corresponding end portion of the rack housing 18 and the tie rod 15, respectively. The pinion shaft 12 is connected to the intermediate shaft 8 via the second universal joint 9. A pinion 12a is connected to a distal end portion of the pinion shaft 12. A rack 13a that engages with the pinion 12a is formed in an intermediate portion of the rack shaft 13 in the axial direction. A steering gear is a rack-and-pinion mechanism including the rack 13a and the pinion 12a. The rotation of the pinion shaft 12 is converted into movement of the rack shaft 13 in the axial direction by the steering gear. By moving the rack shaft 13 in the axial direction, the steered wheels 4 are steered.

When the steering wheel 2 is rotated through a steering operation, the rotation is transmitted to the pinion shaft 12 via the steering shaft 3 and the intermediate shaft 8. The rotation of the pinion shaft 12 is converted into movement of the rack shaft 13 in the axial direction by the pinion 12a and the rack 13a that constitute the steering gear. Thus, the steered wheels 4 are steered. The steering assist mechanism 6 includes an electric motor 21 for steering assistance and a speed reducer 22 that transmits the torque output from the electric motor 21, to the steered mechanism 5. A rotation angle sensor 25, such as a resolver, for detecting a rotation angle θm of a rotor of the electric motor 21 is disposed near the electric motor 21. The speed reducer 22 is a worm gear mechanism including a worm shaft 23 and a worm wheel 24 engaged with the worm shaft 23. The worm shaft 23 is driven to be rotated (hereinafter, simply referred to as "rotated") by the electric motor 21. The worm wheel 24 is connected to the output shaft 3b so as to be rotatable together with the output shaft 3b, The electric motor 21 is connected to the output shaft 3b via the speed reducer 22.

When the worm shaft 23 is rotated by the electric motor 21, the worm wheel 24 is rotated and thus the steering shaft 3 rotates. The rotation of the steering shaft 3 is transmitted to the pinion shaft 12 via the intermediate shaft 8, The rotation of the pinion shaft 12 is converted into movement of the rack shaft 13 in the axial direction. Thus, the steered wheels 4 are steered. As the worm shaft 23 is rotated by the electric motor 21, the steered wheels 4 are steered.

Figure 2:
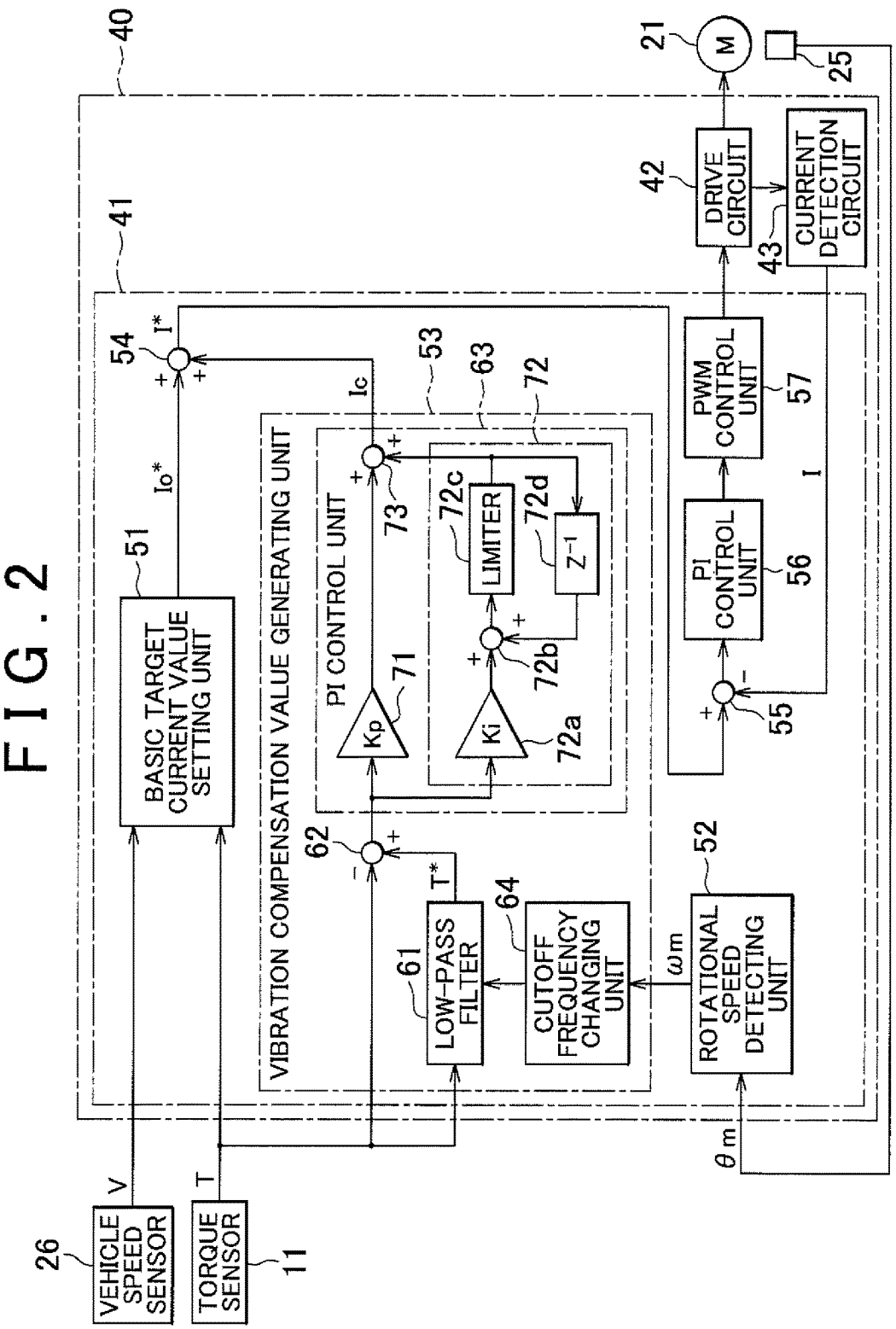
FIG. 2 is a block diagram schematically illustrating the electrical configuration of an ECU.

An output signal from a vehicle speed sensor 26 is also input into the ECU 40. The ECU 40 controls the electric motor 21 on the basis of, for example, the detected steering torque value T detected by the torque sensor 11, the detected vehicle speed value V detected by the vehicle speed sensor 26, and the rotation angle θm detected by the rotation angle sensor 25. FIG. 2 is a block diagram schematically illustrating the electrical configuration of the ECU 40.

The ECU 40 includes a microcomputer 41 that controls the electric motor 21, a drive circuit (inverter circuit) 42 that is controlled by the microcomputer 41 to supply electric power to the electric motor 21, and a current detection circuit 43 that detects a motor current I supplied to the electric motor 21. The microcomputer 41 includes a CPU and memories such as a ROM and a RAM, and serves as a plurality of functional units by executing prescribed programs. The functional units include a basic target current value setting unit 51, a rotational speed detecting unit 52, a vibration compensation value generating unit 53, a target current value computing unit 54, a current deviation computing unit 55, a proportional-integral (PI) control unit 56, and a PWM control unit 57.

Figure 3:
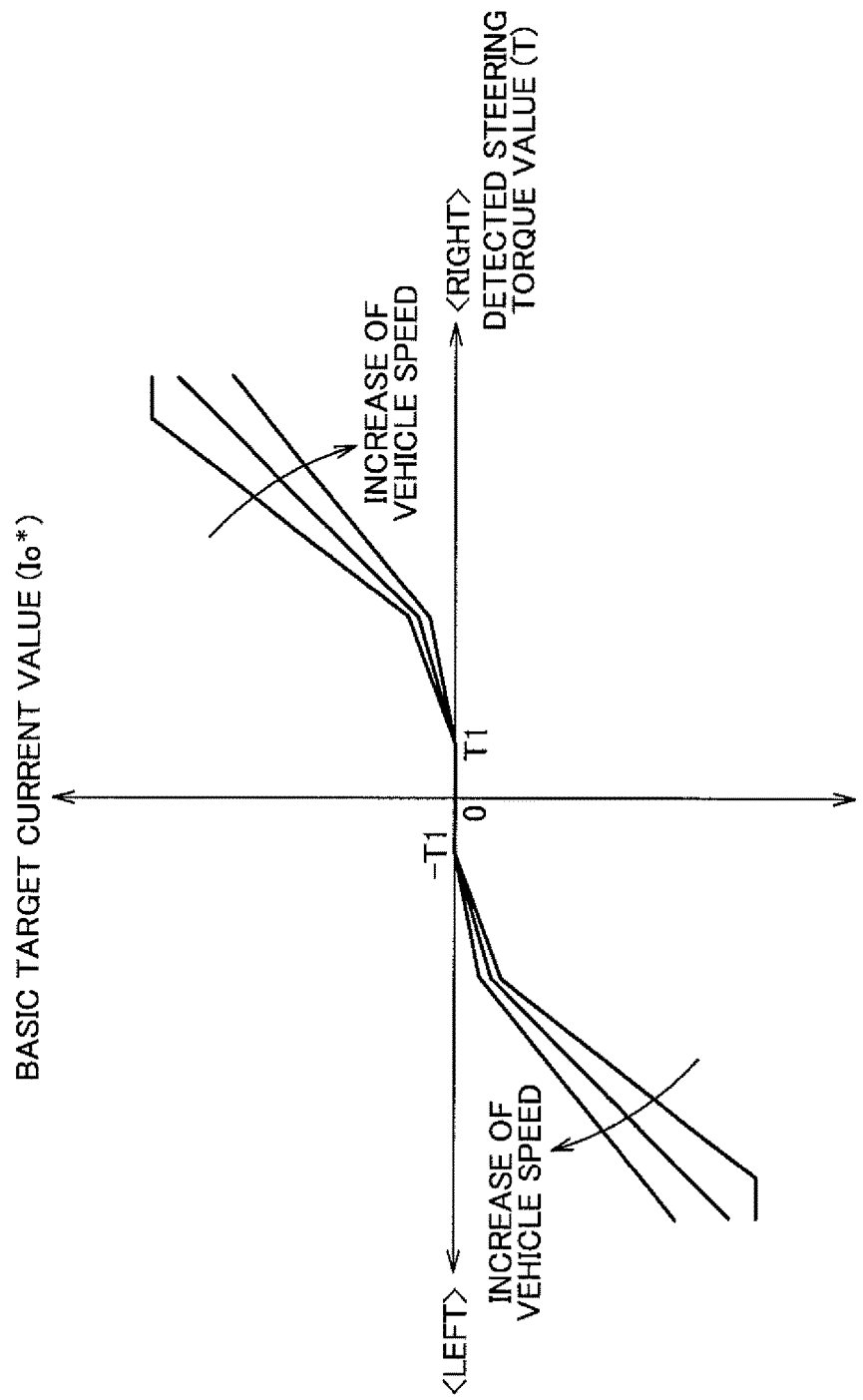
FIG. 3 is a graph illustrating an example of the manner of setting a basic target current value.

The basic target current value setting unit 51 sets a basic target current value Io* on the basis of a detected steering torque value T detected by the torque sensor 11 and a detected vehicle speed value V detected by the vehicle speed sensor 26. An example of the manner of setting the basic target current value Io* with respect to the detected steering torque value T is illustrated in FIG. 3. With regard to the detected steering torque value T, for example, the torque for steering the vehicle to the right takes a positive value and the torque for steering the vehicle to the left takes a negative value. The basic target current value Io* takes a positive value when a steering assist force for steering to the right should be generated by the electric motor 21, and takes a negative value when a steering assist force for steering to the left should be generated by the electric motor 21.

The basic target current value Io* takes a positive value with respect to a positive value of the detected steering torque value T, and takes a negative value with respect to a negative value of the detected steering torque value T. The basic target current value Io* is set such that the larger the absolute value of the detected steering torque value T is, the larger the absolute value of the basic target current value Io* is. However, when the detected steering torque value T is a low value within a range (torque dead zone) of −T1 to T1 (for example, T1=0.4 N·m), the basic target current value Io* is zero. The basic target current value Io* is set such that the higher the detected vehicle speed value V detected by the vehicle speed sensor 26 is, the smaller the absolute value of the basic target current value Io* is. Thus, a large steering assist force is generated when the vehicle is traveling at a low speed, and the steering assist force is made small when the vehicle is traveling at a high speed.

The rotational speed detecting unit 52 detects a rotational speed ωm of the electric motor 21 by computing a temporal differential value of the rotation angle θm detected by the rotation angle sensor 25. The vibration compensation value generating unit 53 includes a low-pass filter 61, a steering torque deviation computing unit 62, a proportional-integral (PI) control unit 63, and a cutoff frequency changing unit 64. The low-pass filter 61 executes a low-pass filtering process on the detected steering torque value T detected by the torque sensor 11. Thus, a component equal to or higher than the cutoff frequency of the low-pass filter 61 is removed from the detected steering torque value T detected by the torque sensor 11. Thus, a steering torque value T* obtained by removing a vibration component from the detected steering torque value T is extracted.

The steering torque deviation computing unit 62 computes a deviation (steering torque deviation $\Delta T=T^*-T$) between the detected steering torque value T* obtained through the low-pass filtering process and the detected steering torque value T detected by the torque sensor 11. The PI control unit 63 generates a vibration compensation value Ic used to lead the steering torque (detected steering torque value T) to the steering torque value T* (the detected steering torque value obtained through the low-pass filtering process) obtained by removing the vibration component from the detected steering torque value T, by executing PI computation on the steering torque deviation $\Delta T$ computed by the steering torque deviation computing unit 62.

Specifically, the PI control unit 63 includes a proportional element 71, an integral element 72, and an adder 73. The proportional element 71 computes a proportional operation value by multiplying the steering torque deviation $\Delta T$ by a proportional gain Kp. The integral element 72 includes a multiplier 72a, an adder 72b, a limiter 72c, and a delay unit 72d. The multiplier 72a multiplies the steering torque deviation $\Delta T$ by an integral gain Ki. The adder 72b adds an immediately preceding integral operation value to an output value from the multiplier 72a. The limiter 72c limits the output value from the adder 72b to a value equal to or greater than a prescribed lower limit value and equal to or less than a prescribed upper limit value. The output value from the limiter 72c is a present integral operation value. The delay unit 72d outputs the present integral operation value with a delay of one computation cycle. The output value (immediately preceding integral operation value) from the delay unit 72d is supplied to the adder 72b.

The proportional operation value computed by the proportional element 71 and the integral operation value computed by the integral element 72 are supplied to the adder 73. The adder 73 computes the vibration compensation value Ic by adding the proportional operation value and the integral operation value together. The basic target current value Io* set by the basic target current value setting unit 51 and the vibration compensation value Ic generated by the vibration compensation value generating unit 53 are supplied to the target current value computing unit 54. The target current value computing unit 54 computes the target current value I* by adding the vibration compensation value Ic to the basic target current value Io*.

The current deviation computing unit 55 computes a deviation (current deviation $\Delta I=I^*-I$) between the target current value I* computed by the target current value computing unit 54 and the detected current value I detected by the current detection circuit 43. The PI control unit 56 generates a drive command value for leading the current I supplied to the electric motor 21 to the target current value I*, by executing PI computation on the current deviation ΔI computed by the current deviation computing unit 55. The PWM control unit 57 generates a PWM control signal with a duty ratio corresponding to the drive command value and supplies the generated PWM control signal to the drive circuit 42. Thus, electric power corresponding to the drive command value is supplied to the electric motor 21.

The steering torque deviation computing unit 62 and the PI control unit 63 constitutes a steering torque feedback controller. The detected steering torque value T is controlled so as to approach the steering torque value T* obtained by removing the vibration component from the detected steering torque value T, by the operation of the steering torque feedback controller. The current deviation computing unit 55 and the PI control unit 56 constitutes a current feedback controller. The current supplied to the electric motor 21 is controlled so as to approach the target current value I* computed by the target current value computing unit 54, by the operation of the current feedback controller.

Figure 4:
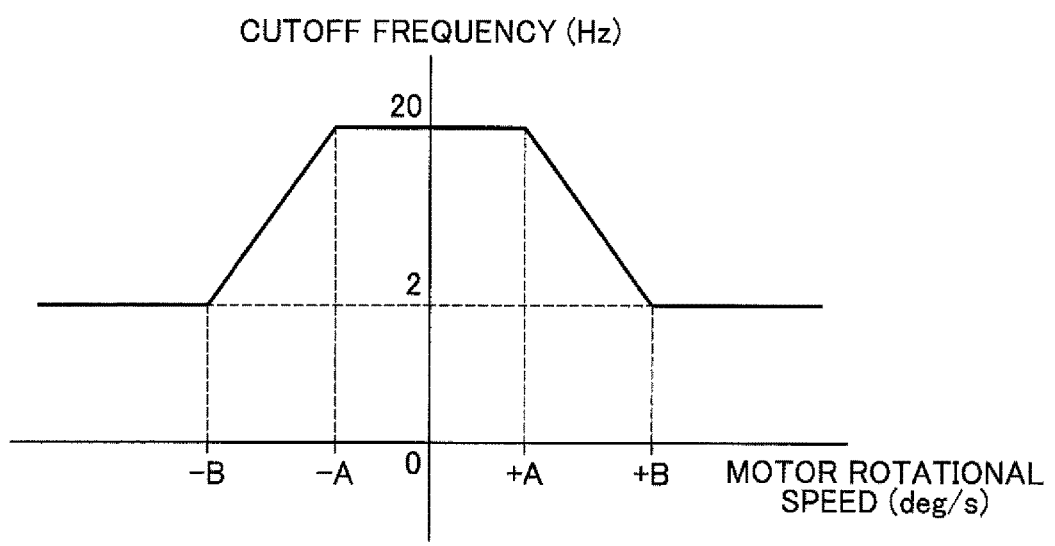
FIG. 4 is a graph illustrating an example of the manner of setting a cutoff frequency of a low-pass filter with respect to a motor rotational speed.

The cutoff frequency changing unit 64 changes the cutoff frequency of the low-pass filter 61 on the basis of the motor rotational speed ωm detected by the rotational speed detecting unit 52. FIG. 4 illustrates an example of the manner of setting the cutoff frequency of the low-pass filter 61 with respect to the motor rotational speed ωm. When the motor rotational speed ωm is within a range from a prescribed value −A (A>0) to a prescribed value +A, the cutoff frequency is set to a prescribed maximum value (20 Hz in this example). The prescribed value A is set to, for example, 400 deg/s.

When the motor rotational speed ωm is within a range equal to and lower than a prescribed value −B (B>A) or within a range equal to and higher than a prescribed value B, the cutoff frequency is set to a prescribed minimum value (two Hz in this example). The prescribed value B is set to, for example, 1000 deg/s. When the motor rotational speed ωm is within a range between the prescribed value −A and the prescribed value −B or within a range between the prescribed value A and the prescribed value B, the cutoff frequency is set so as to decrease from the maximum value to the minimum value as the absolute value of the motor rotational speed ωm increases. The reason why the cutoff frequency is changed depending on the motor rotational speed mm and according to the characteristics illustrated in FIG. 4 will be described later.

In the above-described embodiment, the vibration compensation value Ic for leading the detected steering torque value T to the steering torque value T* obtained by removing the vibration component from the detected steering torque value T is generated by the vibration compensation value generating unit 53. The target current value I* is computed by adding the vibration compensation value Ic to the basic target current value Io*. The electric motor 21 is controlled so that the current supplied to the electric motor 21 approaches the target current value I*. Thus, when a tire bursts, the electric motor 21 is controlled so that the actual steering torque value approaches the steering torque value T* obtained by removing the vibration component based on the burst of the tire from the detected steering torque value T. Because the vibration based on the burst of the tire is suppressed, it is possible to suppress variations in the steering torque at the time of occurrence of the tire burst.

The reason why the cutoff frequency is changed depending on the motor rotational speed ωm and according to the characteristics illustrated in FIG. 4 will be described below. A main object of the present embodiment is to suppress variations in the steering torque by suppressing vibration based on tire burst when a tire bursts. That is, a main object of the present embodiment is to suppress variations in the steering torque due to torsion generated in the torsion bar 10 by a force from the tire side. Because the control according to the present embodiment is control for causing the actual steering torque to approach the steering torque value obtained by removing the vibration component from the detected steering torque value, the steering torque is smaller than that in the case where the target current value is set without taking into account the vibration compensation value.

The electric motor 21 is connected to the output shaft 3b via the speed reducer 22. Thus, the case where steering torque is generated when the motor rotational speed of the electric motor 21 is small is deemed to be a case where torsion is generated in the torsion bar 10 by the force from the steering wheel 2 side instead of the force from the tire side. In this case, because vibration based on the force from the tire side is deemed not to be generated, it is not necessary to suppress vibration and it is preferable that the vibration suppression effect be reduced to prevent the steering torque from being excessively small.

On the other hand, the higher the cutoff frequency of the low-pass filter 61 is, the broader the pass band of the low-pass filter 61 is and the narrower the frequency band of the vibration component removed by the low-pass filter 61 is. Thus, the higher the cutoff frequency of the low-pass filter 61 is, the lower the vibration suppression effect is. Thus, when the absolute value of the motor rotational speed is equal to or smaller than the prescribed value A, the cutoff frequency of the low-pass filter 61 is set to the maximum value to reduce the vibration suppression effect. When the absolute value of the motor rotational speed is within a range between the prescribed value A and the prescribed value B (B>A), it is deemed that the larger the absolute value of the motor rotational speed is, the higher the possibility that steering torque will be generated by the force from the tire side is. Thus, by gradually lowering the cutoff frequency of the low-pass filter 61 with an increase of the absolute value of the motor rotational speed, the vibration suppression effect is gradually enhanced. When the absolute value of the motor rotational speed is equal to or greater than the prescribed value B, the cutoff frequency of the low-pass filter 61 is set to the minimum value to enhance the vibration suppression effect.

Figure 5:
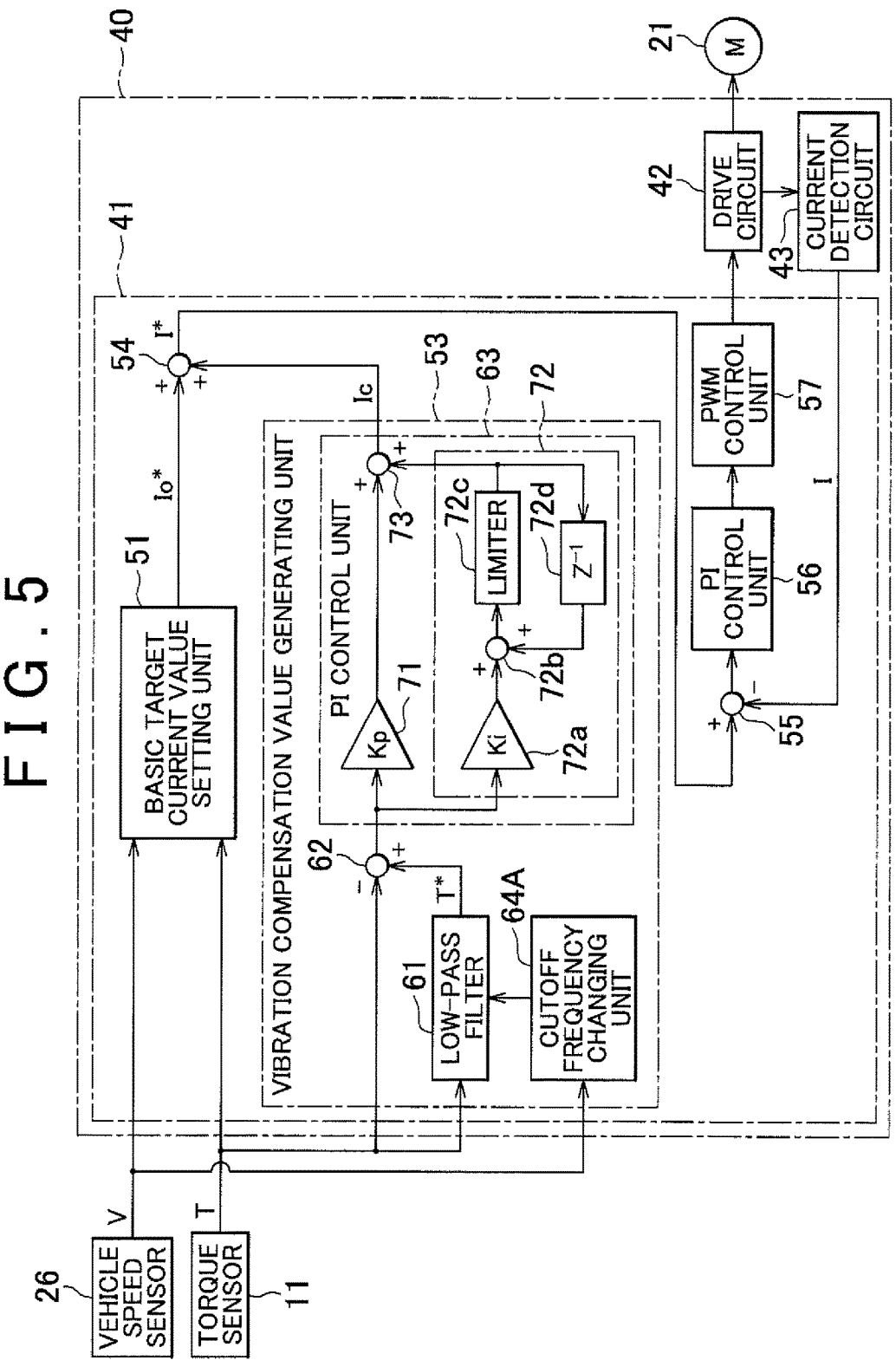
FIG. 5 is a block diagram illustrating another example of the ECU.
Figure 6:
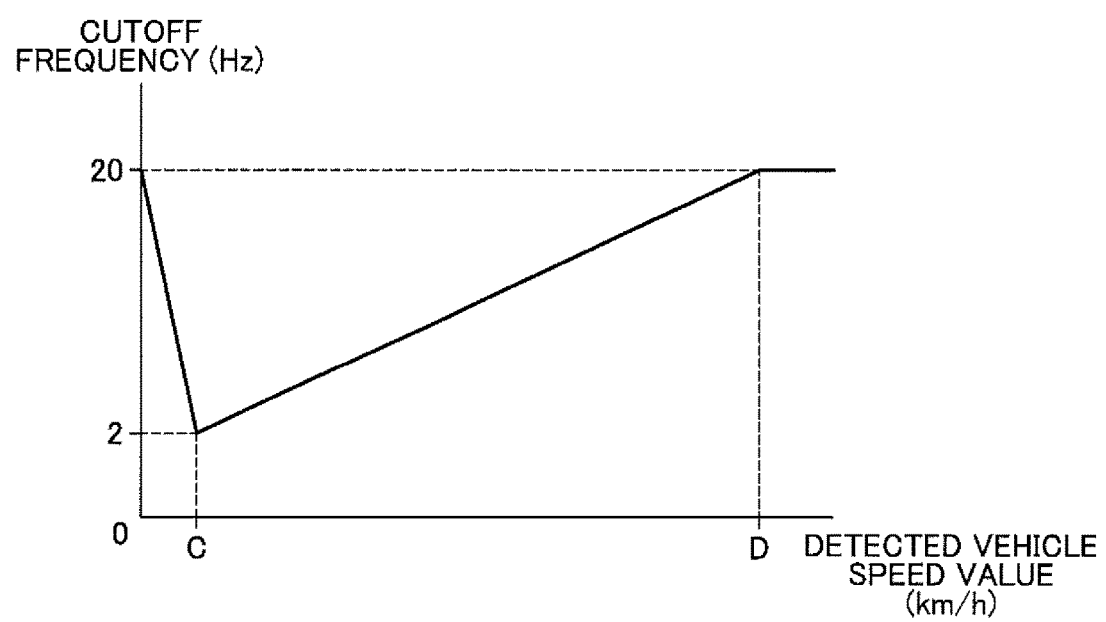
FIG. 6 is a graph illustrating an example of the manner of setting a cutoff frequency of the low-pass filter with respect to a detected vehicle speed value.

FIG. 5 is a block diagram illustrating another example of the ECU 40. In FIG. 5, elements corresponding to those illustrated in FIG. 2 will be denoted by the same reference symbols as those illustrated in FIG. 2. In the ECU 40, the operation of a cutoff frequency changing unit 64A is different from the operation of the cutoff frequency changing unit 64 illustrated in FIG. 2. The cutoff frequency changing unit 64A changes the cutoff frequency of the low-pass filter 61 on the basis of the detected vehicle speed value V detected by the vehicle speed sensor 26. FIG. 6 illustrates an example of the manner of setting the cutoff frequency of the low-pass filter 61 with respect to the detected vehicle speed value V. When the detected vehicle speed value V is equal to a prescribed value C (C>0), the cutoff frequency is set to a prescribed minimum value (two Hz in this example). The prescribed value C is set to, for example, five km/h.

When the detected vehicle speed value V is within a range from the prescribed value C to zero, the cutoff frequency is set such that the cutoff frequency increases from the minimum value to a prescribed maximum value (20 Hz in this example) with a decrease in the detected vehicle speed value V. When the detected vehicle speed value V is within a range between the prescribed value C and a prescribed value D (D>C), the cutoff frequency is set such that the cutoff frequency increases from the minimum value to the maximum value with an increase in the detected vehicle speed value V. The prescribed value D is set to, for example, 80 km/h. When the detected vehicle speed value V is within a range equal to and greater than the prescribed value D, the cutoff frequency is set to the maximum value.

When the cutoff frequency of the low-pass filter 61 is lowered, the frequency band of the vibration component that can be removed by the low-pass filter 61 is broadened, but components other than the vibration component are likely to be removed. Thus, it is preferable that the cutoff frequency of the low-pass filter 61 be set to a value as high as possible, as long as the vibration component to be suppressed can be removed. When a tire bursts, vibration based on the tire burst is periodically generated. The frequency of the vibration increases as the vehicle speed increases. Thus, within the range between the prescribed value C and the prescribed value D, the cutoff frequency gradually increases from the minimum value to the maximum value with an increase in the detected vehicle speed value V. Within the range equal to and greater than the prescribed value D in which the cutoff frequency is the maximum value, the cutoff frequency is fixed to the maximum value.

On the other hand, when the vehicle speed is low, even if a tire bursts, vibration is not generated. Thus, when the detected vehicle speed value V is within the range from the prescribed value C to zero, the cutoff frequency is gradually increased from the minimum value to the maximum value, so that the vibration suppression effect is gradually reduced with a decrease in the detected vehicle speed value V.

Figure 7:
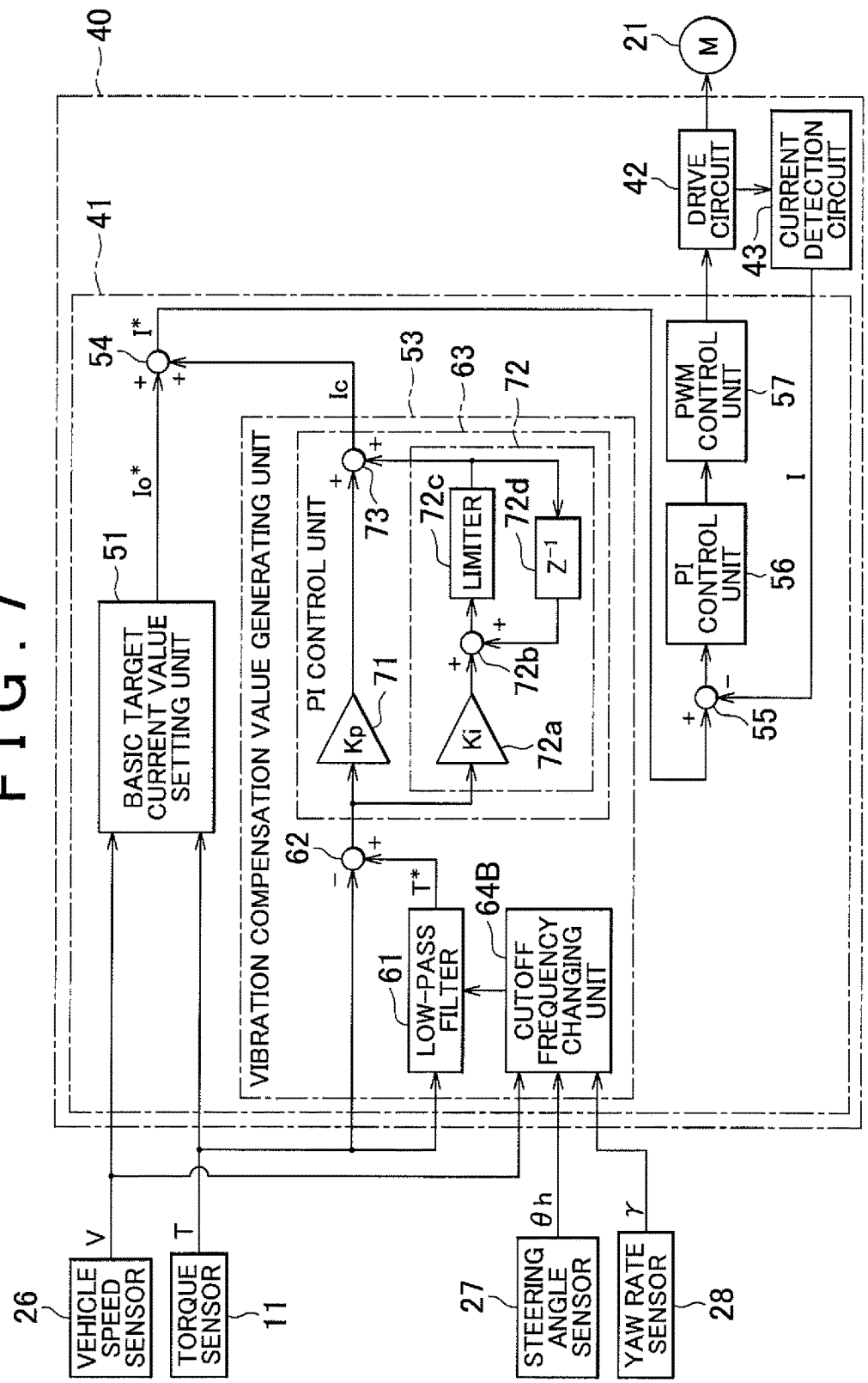
FIG. 7 is a block diagram illustrating another example of the ECU.

FIG. 7 is a block diagram illustrating another example of the ECU 40. In FIG. 7, elements corresponding to those illustrated in FIG. 2 will be denoted by the same reference symbols as those illustrated in FIG. 2. In the ECU 40, the operation of a cutoff frequency changing unit 64B is different from the operation of the cutoff frequency changing unit 64 illustrated in FIG. 2. In the ECU 40, the operation of a cutoff frequency changing unit 64B is different from the operation of the cutoff frequency changing unit 64 illustrated in FIG. 2. When the cutoff frequency changing unit 6411 is employed, there are provided a steering angle sensor 27 that detects a steering angle, which is a rotation angle of the input shaft 3a, and a yaw rate sensor 28 that detects a yaw rate, which is a variation rate of the rotation angle in the turning direction of the vehicle. The steering angle sensor 27 detects a degree of rotation (rotation angle) of the steering wheel 2 in each of both forward and reverse directions from the neutral position (reference position) of the steering wheel 2. The steering angle sensor 27 outputs the degree of rotation to the right from the neutral position as a positive value, and outputs the degree of rotation to the left from the neutral position as a negative value.

The cutoff frequency changing unit 64B changes the cutoff frequency of the low-pass filter 61 on the basis of the detected vehicle speed value V detected by the vehicle speed sensor 26, a detected steering angle value θh detected by the steering angle sensor 27, and a detected yaw rate value γ detected by the yaw rate sensor 28. The cutoff frequency changing unit 64B changes the cutoff frequency of the low-pass filter 61 on the basis of the absolute value |γe−γ| of a deviation between an estimated yaw rate value γe (γe=θh·V) computed by multiplying the detected steering angle value θh (deg) by the detected vehicle speed value V (km/h) and the detected yaw rate value γ (deg/s) detected by the yaw rate sensor 28.

Figure 8:
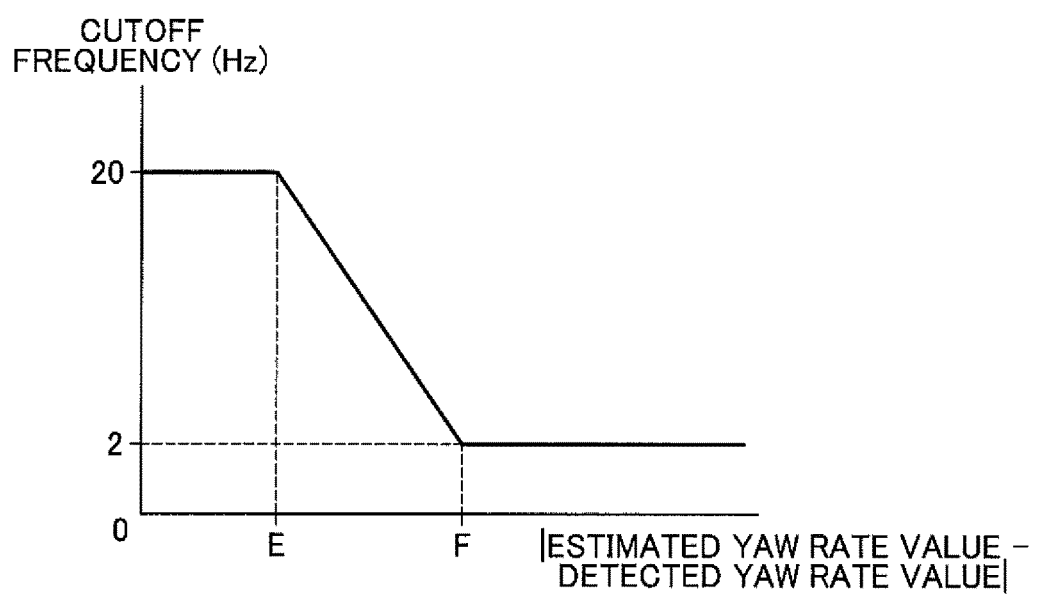
FIG. 8 is a graph illustrating an example of the manner of setting a cutoff frequency of the low-pass filter with respect to the absolute value of a deviation between an estimated yaw rate value and a detected yaw rate value.

FIG. 8 illustrates an example of the manner of setting the cutoff frequency of the low-pass filter 61 with respect to the absolute value |γe−γ| of the deviation between the estimated yaw rate value γe and the detected yaw rate value γ. When the absolute value |γe−γ| of the deviation is equal to or less than a prescribed value E (E>0), the cutoff frequency is set to a prescribed maximum value (20 Hz in this example). The prescribed value E is set to, for example, 30.

When the absolute value |γe−γ| of the deviation is equal to or greater than a prescribed value F (F>E), the cutoff frequency is set to a prescribed minimum value (two Hz in this example). The prescribed value F is set to, for example, 100. When the absolute value |γe−γ| of the deviation is within a range between the prescribed value E and the prescribed value F, the cutoff frequency is set such that the cutoff frequency decreases from the maximum value to the minimum value with an increase in the absolute value |γe−γ| of the deviation.

When the vehicle is travelling normally, the absolute value |γe−γ| of the deviation between the estimated yaw rate value γe and the detected yaw rate value γ is small. On the other hand, when a tire bursts, the vehicle skids toward one side and thus the driver performs a steering operation for preventing the skid. Thus, the absolute value |γe−γ| of the deviation between the estimated yaw rate value γe and the detected yaw rate value γ increases. Therefore, when the absolute value |γe−γ| of the deviation is equal to or less than the prescribed value E, it is deemed that no tire bursts and thus the cutoff frequency is set to the maximum value to reduce the vibration suppression effect. When the absolute value |γe−γ| of the deviation is within the range between the prescribed value E and the prescribed value F, it is deemed that the possibility that a tire bursts increases with an increase in the absolute value |γe−γ| of the deviation and thus the cutoff frequency is made to gradually decrease with an increase in the absolute value |γe−γ| of the deviation. When the absolute value |γe−γ| of the deviation is equal to or greater than the prescribed value F, it is deemed that the possibility that a tire bursts is high and thus the cutoff frequency is set to the minimum value to enhance the vibration suppression effect.

Figure 9:
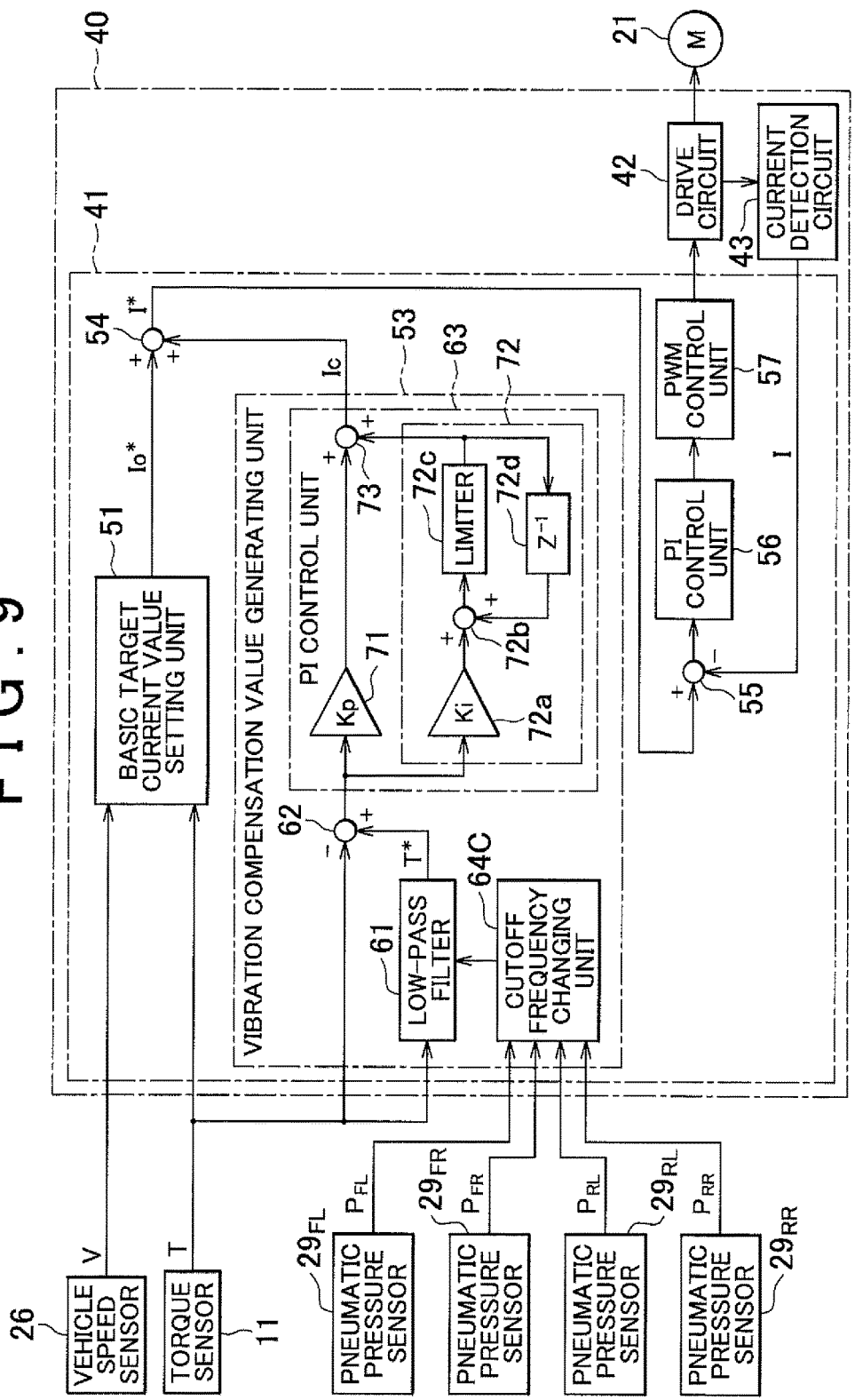
FIG. 9 is a block diagram illustrating still another example of the ECU.

FIG. 9 is a block diagram illustrating still another example of the ECU 40, In FIG. 9, elements corresponding to those illustrated in FIG. 2 will be denoted by the same reference symbols as those illustrated in FIG. 2. In the ECU 40, the operation of a cutoff frequency changing unit 64C is different from the operation of the cutoff frequency changing unit 64 illustrated in FIG. 2. When this cutoff frequency changing unit 64C is employed, there are provided a pneumatic pressure sensor $29_{FL}$ that detects a pneumatic pressure $P_{FL}$ of the left front tire, a pneumatic pressure sensor $29_{FR}$ that detects a pneumatic pressure $P_{FR}$ of the right front tire, a pneumatic pressure sensor $29_{RL}$ that detects a pneumatic pressure $P_{RL}$ of the left rear tire, and a pneumatic pressure sensor $29_{RR}$ that detects a pneumatic pressure $P_{RR}$ of the right rear tire.

Figure 10:
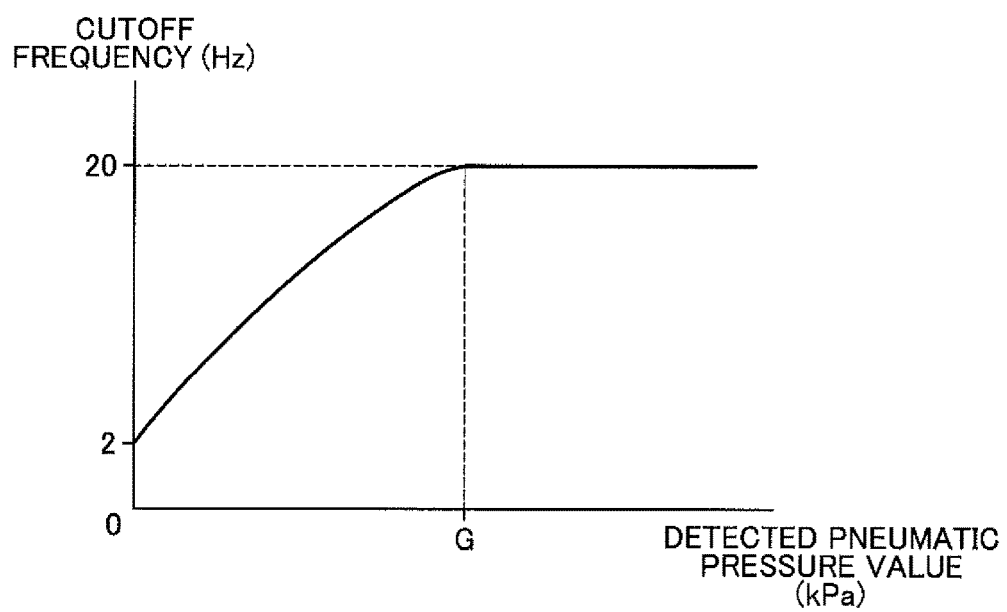
FIG. 10 is a graph illustrating an example of the manner of setting a cutoff frequency of the low-pass filter with respect to a detected pneumatic pressure value.

The cutoff frequency changing unit 64C changes the cutoff frequency of the low-pass filter 61 on the basis of detected pneumatic pressure values $P_{FL}$, $P_{FR}$, $P_{RL}$, $P_{RR}$ detected by the pneumatic pressure sensors $29_{FL}$, $29_{FR}$, $29_{RL}$, $29_{RR}$, respectively. The cutoff frequency changing unit 64C first sets the cutoff frequencies respectively corresponding to the detected pneumatic pressure values $P_{FL}$, $P_{FR}$, $P_{RL}$, $P_{RR}$ on the basis of the detected pneumatic pressure values $P_{FL}$, $P_{FR}$, $P_{RL}$, $P_{RR}$ (cutoff frequency setting unit). FIG. 10 illustrates an example of the manner of setting the cutoff frequency of the low-pass filter 61 with respect to the detected pneumatic pressure value.

When the detected pneumatic pressure value is equal to or greater than a prescribed value G (G>0), the cutoff frequency is set to a prescribed maximum value (20 Hz in this example). The prescribed value G is set to, for example, 240 kPa. When the detected pneumatic pressure value is within a range between the prescribed value G (G>0) and zero, the cutoff frequency is set such that the cutoff frequency decreases from the maximum value to a prescribed minimum value (2 Hz in this example) with a decrease in the detected pneumatic pressure value.

When the cutoff frequencies respectively corresponding to the detected pneumatic pressure values $P_{FL}$, $P_{FR}$, $P_{RL}$, $P_{RR}$ are computed, the cutoff frequency changing unit 64C sets the minimum value among the cutoff frequencies respectively corresponding to the detected pneumatic pressure values $P_{FL}$, $P_{FR}$, $P_{RL}$, $P_{RR}$ as the cutoff frequency of the low-pass filter 61 (final cutoff frequency determining unit).

Figure 11:
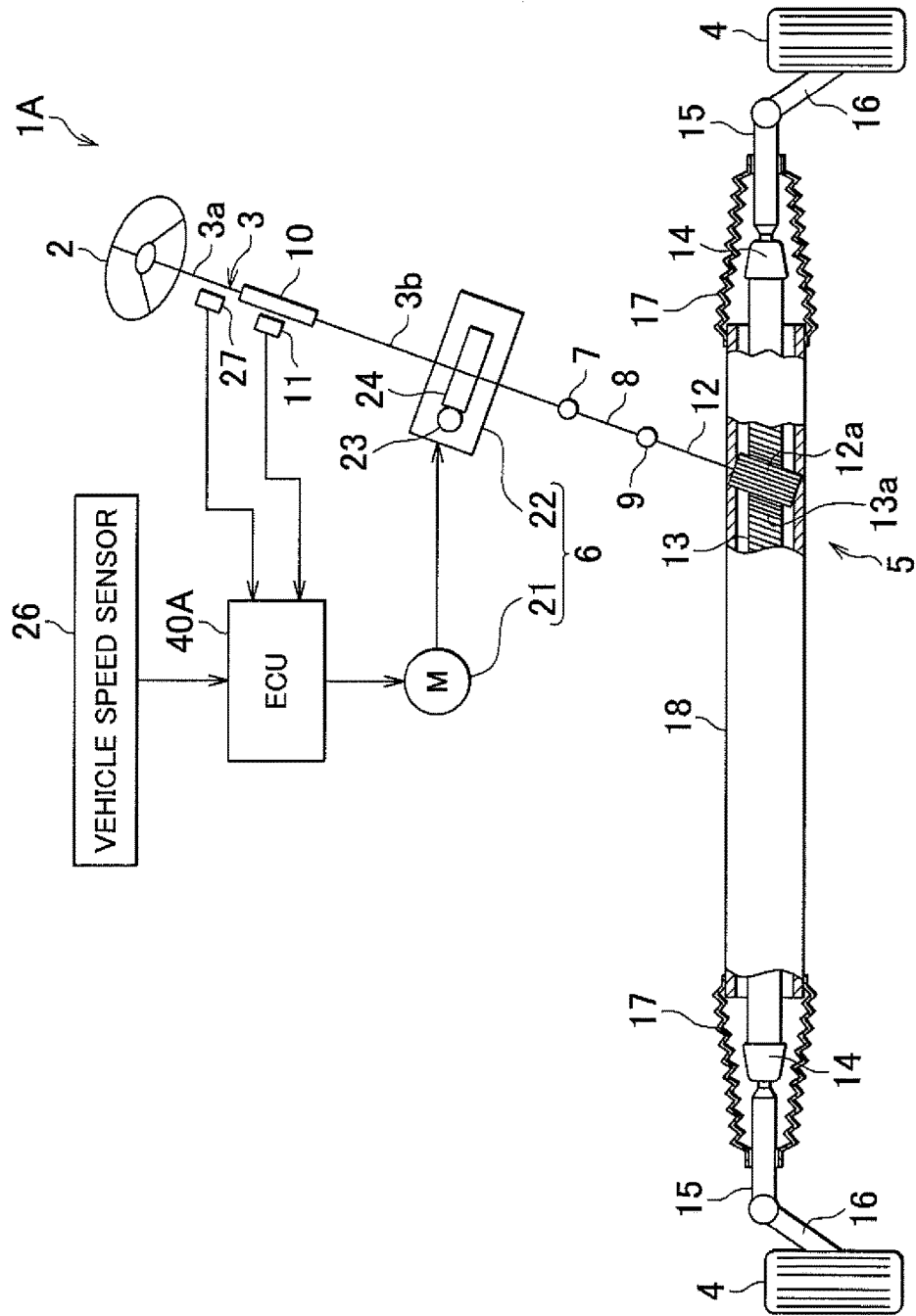
FIG. 11 is a schematic view illustrating the schematic configuration of an electric power steering system according to a second embodiment of the invention.

FIG. 11 is a schematic view illustrating the schematic configuration of an electric power steering system 1A according to a second embodiment of the invention. In FIG. 11, elements corresponding to those illustrated in FIG. 1 are denoted by the same reference symbols as those illustrated in FIG. 2.

The electric power steering system 1A includes a steering angle sensor 27 that detects a steering angle θh, which is the rotation angle of the input shaft 3a, in addition to the torque sensor 11 and the vehicle speed sensor 26. The steering angle sensor 27 detects a degree of rotation (rotation angle) in each of both forward and reverse directions of the steering wheel 2 from the neutral position (reference position) of the steering wheel 2. The steering angle sensor 27 outputs the degree of rotation to the right from the neutral position as a positive value, and outputs the degree of rotation to the left from the neutral position as a negative value.

The detected steering torque value T detected by the torque sensor 11, the detected vehicle speed value V detected by the vehicle speed sensor 26, and the detected steering angle value θh detected by the steering angle sensor 27 are input into an ECU 40A. The ECU 40A controls the electric motor 21 on the basis of, for example, the detected steering torque value T detected by the torque sensor 11, the detected vehicle speed value V detected by the vehicle speed sensor 26, and the detected steering angle value θh detected by the steering angle sensor 27.

Figure 12:
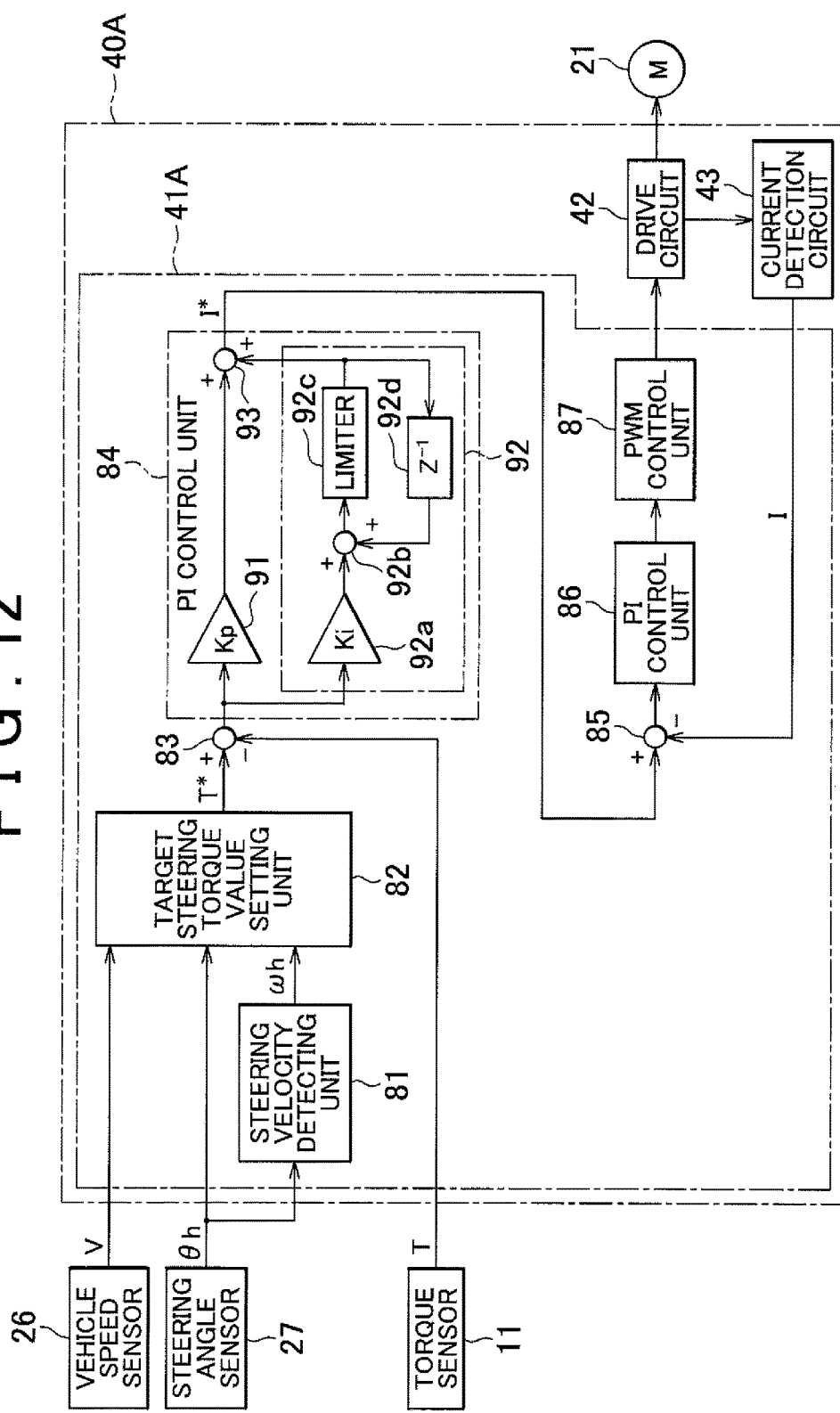
FIG. 12 is a block diagram schematically illustrating the electrical configuration of an ECU.

FIG. 12 is a block diagram schematically illustrating the electrical configuration of the ECU 40A. The ECU 40A includes a microcomputer 41A that controls the electric motor 21, a drive circuit (inverter circuit) 42 that is controlled by the microcomputer 41A and that supplies electric power to the electric motor 21, and a current detection circuit 43 that detects a motor current I supplied to the electric motor 21.

The microcomputer 41A includes a CPU and memories such as a ROM and a RAM, and serves as a plurality of functional units by executing prescribed programs. The functional units include a steering velocity detecting unit 81, a target steering torque value setting unit 82, a steering torque deviation computing unit 83, a proportional-integral (PI) control unit 84, a current deviation computing unit 85, a PI control unit 86, and a PWM control unit 87.

The steering velocity detecting unit 81 detects a steering velocity ωh by computing the temporal differential value of the detected steering angle value θh detected by the steering angle sensor 27. The target steering torque value setting unit 82 sets the target steering torque value T* on the basis of the detected steering angle value θh detected by the steering angle sensor 27, the detected vehicle speed value V detected by the vehicle speed sensor 26, and the detected steering velocity ωh detected by the steering velocity detecting unit 81.

Figure 13:
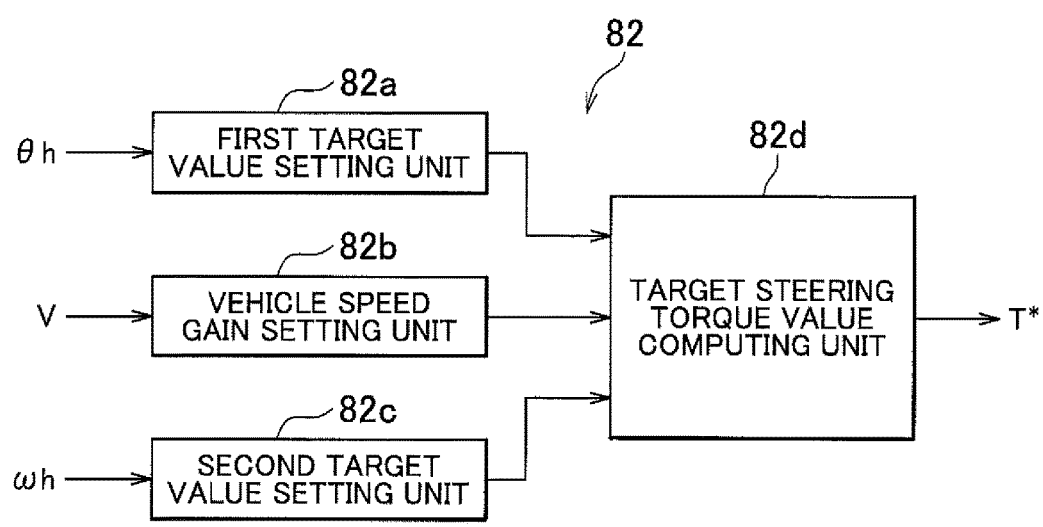
FIG. 13 is a block diagram illustrating the configuration of a target steering torque value setting unit.
Figure 14:
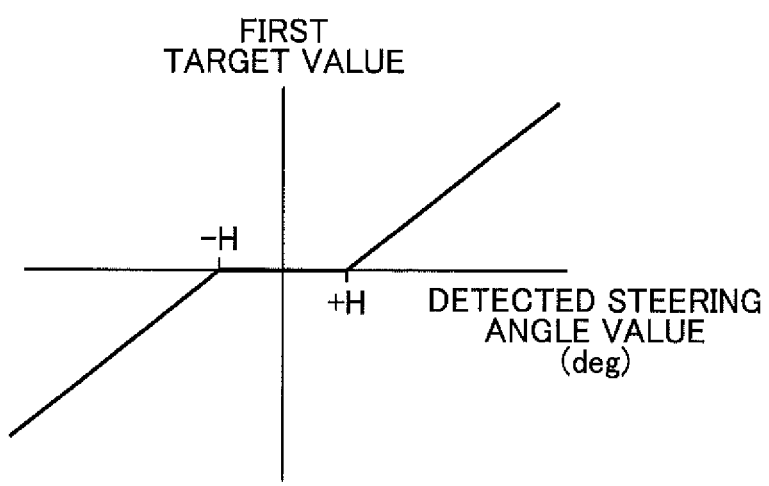
FIG. 14 is a graph illustrating an example of the manner of setting a first target value with respect to a detected steering angle value.

FIG. 13 is a block diagram illustrating the configuration of the target steering torque value setting unit 82. The target steering torque value setting unit 82 includes a first target value setting unit 82a, a vehicle speed gain setting unit 82b, a second target value setting unit 82c, and a target steering torque value computing unit 82d. The first target value setting unit 82a sets a first target value that is a target steering torque value corresponding to the detected steering angle value θh on the basis of the detected steering angle value θh. FIG. 14 illustrates an example of the manner of setting the first target value with respect to the detected steering angle value θh. When the detected steering angle value θh is within a range from a prescribed value −H (H>0) to a prescribed value +H, the first target value is set to zero. The prescribed value H is set to, for example, three degrees. When the detected steering angle value θh falls outside a range from the prescribed value −H to the prescribed value +H, the first target value is set to a positive value (torque directed to the right) if the detected steering angle value θh is a positive value (steering to the right), and is set to a negative value (torque directed to the left) when the detected steering angle value θh is a negative value (steering to the left). When the detected steering angle value θh falls outside the range from the prescribed value −H to the prescribed value +H, the first target value is set such that the absolute value of the first target value increases with an increase in the absolute value of the detected steering angle value θh.

Figure 15:
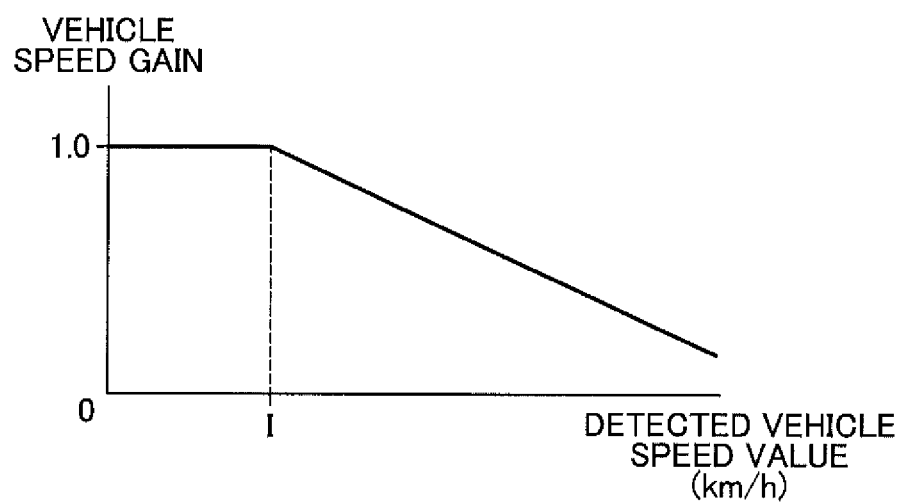
FIG. 15 is a graph illustrating an example of the manner of setting a vehicle speed gain with respect to a detected vehicle speed value.

The vehicle speed gain setting unit 82b computes a vehicle speed gain on the basis of the detected vehicle speed value V. FIG. 15 illustrates an example of the manner of setting the vehicle speed gain with respect to the detected vehicle speed value V. When the detected vehicle speed value V is equal to or less than a prescribed value I (I>0), the vehicle speed gain is set to one (1.0). The prescribed value I is set to, for example, five km/h. When the detected vehicle speed value V is greater than the prescribed value I, the vehicle speed gain is set so that the vehicle speed gain gradually decreases from one (1.0) with an increase in the detected vehicle speed value V.

Figure 16:
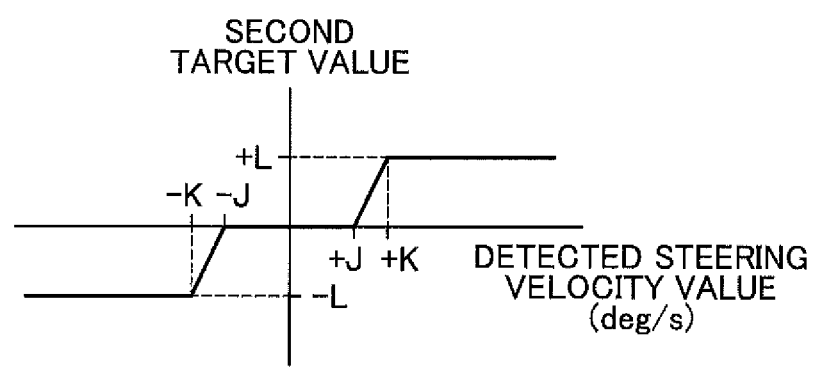
FIG. 16 is a graph illustrating an example of the manner of setting a second target value with respect to a detected steering velocity value.

The second target value setting unit 82c computes a second target value that is the target steering torque value corresponding to the detected steering velocity value ωh on the basis of the detected steering velocity value ωh. FIG. 16 illustrates an example of the manner of setting the second target value with respect to the detected steering velocity value ωh. When the detected steering velocity value ωh is within a range from a prescribed value −J (J>0) to a prescribed value +J, the second target value is set to zero. When the detected steering velocity value ωh is equal to or less than a prescribed value K (K>J), the second target value is set to a prescribed value −L (L>0). The prescribed value K is set to, for example, 500 deg/s. The prescribed value L is set to, for example, two. When the detected steering velocity value ωh is within a range between the prescribed value −J and the prescribed value −K, the second target value is set to decrease from zero to the prescribed value −L with a decrease in the detected steering velocity value ωh.

When the detected steering velocity value ωh is equal to or greater than the prescribed value +K, the second target value is set to the prescribed value L. When the detected steering velocity value ωh is within a range between the prescribed value +J and the prescribed value +K, the second target value is set to increase from zero to the prescribed value L with an increase in the detected steering velocity value ωh. The target steering torque value computing unit 82d computes the target steering torque value T* according to Expression (1).

$$\text{Target steering torque value } T^* = \text{first target value} \cdot \text{vehicle speed gain} + \text{second target value} \quad (1)$$

The detected steering angle value θh, the detected vehicle speed value V, and the detected steering velocity value ωh that are used to compute the target steering torque value T* are values that are not influenced by the vibration based on a force from the tire side. Thus, the target steering torque value T* is a target value set under no influence of the vibration based on the force from the tire side.

As illustrated in FIG. 12, the steering torque deviation computing unit 83 computes a deviation (steering torque deviation ΔT=T*−T) between the target steering torque value T* set by the target steering torque value setting unit 82 and the detected steering torque value T detected by the torque sensor 11. The PI control unit 84 generates a target current value I* for leading the steering torque (detected steering torque value T) to the target steering torque value T* by executing PI computation on the steering torque deviation ΔT computed by the steering torque deviation computing unit 83.

Specifically, the PI control unit 84 includes a proportional element 91, an integral element 92, and an adder 93. The proportional element 91 computes a proportional operation value by multiplying the steering torque deviation ΔT by a proportional gain Kp. The integral element 92 includes a multiplier 92a, an adder 92b, a limiter 92c, and a delay unit 92d. The multiplier 92a multiplies the steering torque deviation ΔT by an integral gain Ki. The adder 92b adds an immediately preceding integral operation value to the output value from the multiplier 92a. The limiter 92c limits the output value from the adder 92b to a value equal to or greater than a prescribed lower limit value and equal to or less than a prescribed upper limit value. The output value from the limiter 92c is a present integral operation value. The delay unit 92d outputs the present integral operation value with a delay of one computation cycle. The output value (immediately preceding integral operation value) from the delay unit 92d is supplied to the adder 92b.

The proportional operation value computed by the proportional element 91 and the integral operation value computed by the integral element 92 are supplied to the adder 93. The adder 93 computes the target current value I* by adding the proportional operation value and the integral operation value together. The current deviation computing unit 85 computes a deviation (current deviation ΔI=I*−I) between the target current value I* generated by the PI control unit 84 and the detected current value I detected by the current detection circuit 43.

The PI control unit 86 generates a drive command value for leading the current I supplied to the electric motor 21 to the target current value I* by executing PI computation on the current deviation ΔT computed by the current deviation computing unit 85. The PWM control unit 87 generates a PWM control signal with a duty ratio corresponding to the drive command value, and supplies the generated PWM control signal to the drive circuit 42. Thus, electric power corresponding to the drive command value is supplied to the electric motor 21.

The steering torque deviation computing unit 83 and the PI control unit 84 constitutes a steering torque feedback controller. The steering torque is controlled so as to approach the target steering torque value T* by the operation of the steering torque feedback controller. The current deviation computing unit 85 and the PI control unit 86 constitute a current feedback controller. The current supplied to the electric motor 21 is controlled so as to approach the target current value I* generated by the PI control unit 84, by the operation of the current feedback controller.

In the above-described embodiment, the target current value I* for leading the actual steering torque value (the detected steering torque value T) to the target steering torque value T* is generated by the PI control unit 84. Then, the electric motor 21 is controlled so that the current supplied to the electric motor 21 approaches the target current value I*. As described above, the target steering torque value T* is a target value set under no influence of the vibration based on the force from the tire side. Thus, when a tire bursts, the electric motor 21 is controlled so that the actual steering torque value approaches the target steering torque value T* set under no influence of the vibration based thereon. As a result, the vibration based on the tire burst is suppressed, and thus it is possible to suppress variations in the steering torque when the tire burst occurs.

While the first and second embodiments of the invention have been described above, the invention may be implemented in various other embodiments. For example, in the first embodiment, the vibration compensation value generating unit 53 (see FIG. 2, FIG. 5, FIG. 7, FIG. 9) generates the vibration compensation value Ic by executing the PI computation on the steering torque deviation ΔT computed by the steering torque deviation computing unit 62. Alternatively, the vibration compensation value Ic may be generated by executing proportional (P) computation or proportional-integral-differential (PID) computation on the steering torque deviation ΔT.

The cutoff frequency changing unit 64 (see FIG. 2) according to the first embodiment, the cutoff frequency changing unit 64A (see FIG. 5) according to the first modified example, the cutoff frequency changing unit 64B (see FIG. 7) according to the second modified example, and the cutoff frequency changing unit 64C (see FIG. 9) according to the third modified example may be combined with each other as needed to change the cutoff frequency of the low-pass filter 61.

In the second embodiment, the PI control unit 84 (see FIG. 12) generates the target current value I* by executing the PI computation on the steering torque deviation ΔT computed by the steering torque deviation computing unit 83. Alternatively, the target current value I* may be generated by performing proportional (P) computation or proportional-integral-differential (PID) computation on the steering torque deviation ΔT.

What is claimed is:

1. An electric power steering system that applies steering assist force from an electric motor to a steered mechanism that transmits steering force to steered wheels, comprising:
   a vehicle speed detector that detects a vehicle speed;
   a steering angle detector that detects a steering angle;
   a steering torque detector that detects a steering torque; and
   a processor programmed to:
      detect a steering velocity,
      set a target steering torque value based on a detected steering angle value, a detected vehicle speed value, and a detected steering velocity value, compute a target current value for leading the detected steering torque value to the target steering torque value, based on the set target steering torque value and the detected steering torque value, and control the electric motor based on the computed target current value, wherein the target steering torque value is set by:

setting a first target torque value corresponding to the detected steering angle value, based on the detected steering angle value, setting a vehicle speed gain based on the detected vehicle speed value, setting a second target torque value corresponding to the detected steering velocity value, based on the detected steering velocity value, and computing the target steering torque value by adding the second target torque value to a value obtained by multiplying the first target torque value by the vehicle speed gain.

2. The electric power steering system according to claim 1, wherein the first and second target torque values are not based on the detected vehicle speed.

* * * * *